(12) United States Patent
Ayres

(10) Patent No.: US 6,735,002 B2
(45) Date of Patent: May 11, 2004

(54) METHOD FOR FORMATTING PARTIALLY OVERLAPPING HOLOGRAMS

(75) Inventor: Mark R. Ayres, Boulder, CO (US)

(73) Assignee: Inphase Technologies, Inc., Longmont, CO (US)

( * ) Notice: Subject to any disclaimer, the term of this patent is extended or adjusted under 35 U.S.C. 154(b) by 60 days.

(21) Appl. No.: 10/215,860

(22) Filed: Aug. 9, 2002

(65) Prior Publication Data

US 2003/0043425 A1 Mar. 6, 2003

Related U.S. Application Data

(60) Provisional application No. 60/313,865, filed on Aug. 20, 2001.

(51) Int. Cl.[7] .................................................. G03H 1/30
(52) U.S. Cl. ........................................... 359/25; 359/35
(58) Field of Search .............................. 359/24, 25, 35, 359/11

(56) References Cited

U.S. PATENT DOCUMENTS 4,021,606 A * 5/1977 Takeda ........................ 386/96
5,671,073 A * 9/1997 Psaltis ......................... 359/22
6,055,174 A * 4/2000 Zhou ........................... 365/125

OTHER PUBLICATIONS

Hans J. Coufal et al. (Eds.) Holographic Data Storage, Springer–Verlag, 2000, title page, copyright page, pp. 35–38, 44–47, 53–55, 103–105.

Fai H. Mok et al., "System metric for holographic memory systems", Optics Letters, vol. 21, No. 12, Jun. 15, 1996, pp. 896–898.

* cited by examiner

Primary Examiner—Drew A. Dunn
Assistant Examiner—Leo Boutsikaris
(74) Attorney, Agent, or Firm—Morrison & Foerster LLP

(57) ABSTRACT

A method of writing holograms includes: numbering sections in sequence, where each section has a spatial projection onto a holographic medium; and writing at least one hologram in each of the sections in sequence. Writing in two sections with adjacent spatial projections provides a substantially uniform exposure level for a sequentially subsequent section with a spatial projection that overlaps the two sections.

20 Claims, 3 Drawing Sheets

METHOD FOR FORMATTING PARTIALLY OVERLAPPING HOLOGRAMS

CROSS-REFERENCE TO RELATED APPLICATIONS

This application claims the benefit of provisional application No. 60/313,865, filed Aug. 20, 2001.

TECHNICAL FIELD

The present invention relates to data storage generally and more particularly to holographic data storage.

BACKGROUND ART

Holographic data storage typically achieves high data densities by overlapping many data-bearing holograms in the same recording volume. However, many proposed holographic multiplexing techniques (e.g., shift multiplexing, fractal multiplexing, and correlation multiplexing) result in partially overlapping holograms or groups of holograms. In this case, the device controller is faced with the challenge of formatting the media with intermingled data records. ([1] Coufal, H. T., Psaltis, D., and Sincerbox, G. T. (Eds.), Holographic Data Storage, Springer-Verlag, 2000; [2] Mok, F. H., et. al., "System metric for holographic memory systems," Optics Letters, v. 21, n. 12, Jun. 15, 1996, pp. 896–898.)

In particular, a major constraint of the underlying recording technology is the typical requirement for approximately uniform grating strength across each hologram. According to one approach, an entire hologram is uniformly written on a holographic medium that has been uniformly exposed by previous read and write operations. Alternatively, hologram recording signals may be equalized across their spatial extent by varying intensity or exposure time to account for the non-uniform response of the underlying medium; however, this can lead to complex exposure scheduling that may require integrated measurements.

Additional disadvantages result when the medium has been only partially exposed by recording operations because the remaining capacity is likely to be lost or diminished by subsequent reading operations. Since the holographic recording medium is typically photoreactive in response to the readout (reference) signal, the medium will lose overall recording capacity when the host performs read operations on recorded data that are in partially exposed regions.

Thus, there is a need for recording holograms in a way that maintains uniform exposure and minimizes the amount of partially exposed media.

SUMMARY OF THE INVENTION

In one embodiment of the present invention, a method of writing holograms includes: numbering sections in sequence, where each section has a spatial projection onto a holographic medium; and writing at least one hologram in each of the sections in sequence. Writing in two sections with adjacent spatial projections provides a substantially uniform exposure level for a sequentially subsequent section with a spatial projection that overlaps the two sections.

According to one aspect, one or more holograms can be tested to determine the available dynamic range for recording additional holograms. For example, a test hologram can be measured to determine its efficiency from which an available dynamic range can be estimated for the corresponding location in the holographic medium. An exposure schedule at that location then can be correspondingly adjusted. Similarly, multiple test holograms can be measured to determine available dynamic ranges and exposure schedules at multiple locations.

According to another aspect, additional sections of the holographic medium can be exposed just for the purpose of maintaining a substantially uniform exposure level when sequentially writing holograms in the numbered sections. For example a bookend of additional sections near a boundary of a shelf of the numbered sections can be exposed to provide a substantially uniform exposure level when writing holograms in the shelf in sequence near the boundary. Each additional section similarly has a spatial projection onto the holographic medium and overlaps at least one section of the shelf.

In another embodiment of the present invention, a holographic medium tangibly embodies holograms in a sectional format. The format includes: multiple sections, where each section has a spatial projection onto the holographic medium and each section has a sequence number for storing holograms in sections; and at least one hologram in at least one section, where each section has an exposure level corresponding to holograms therein. Two sections with adjacent spatial projections provide a substantially uniform exposure level for a sequentially subsequent section with a spatial projection that overlaps the two sections. This embodiment may further include the aspects described above.

The present invention enables holographic recording in a way that maintains uniform exposure and minimizes the amount of partially exposed media.

DETAILED DESCRIPTION OF EXEMPLARY EMBODIMENTS

Figure 1:
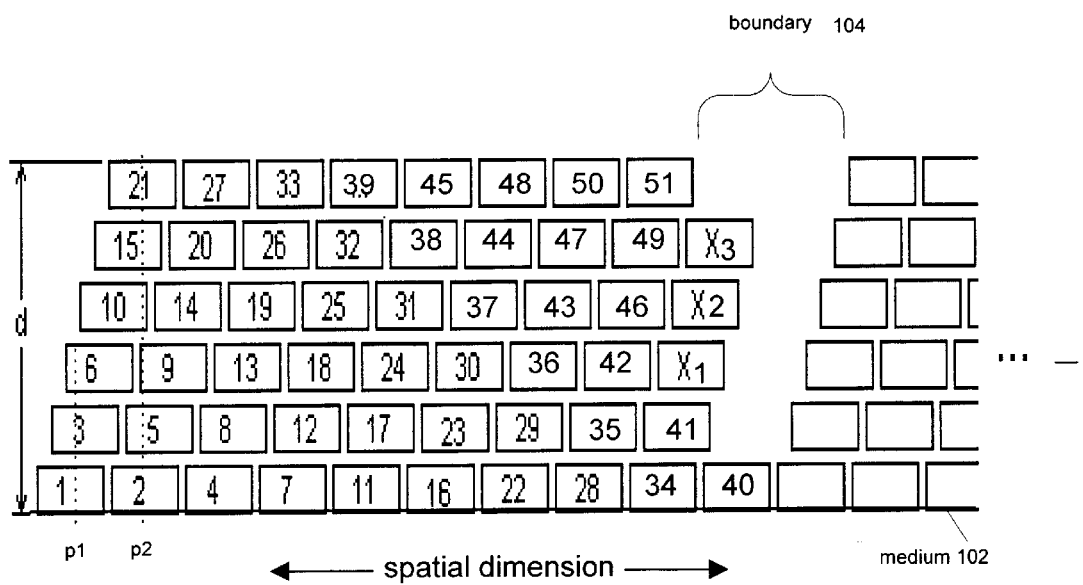
FIG. 1 shows an embodiment of writing holograms according to the present invention.

FIG. 1 illustrates an embodiment of a method for writing holograms according to the present invention. The horizontal dimension represents a lateral spatial dimension in a holographic medium 102 across which holograms are written, and the vertical dimension represents a "stacking dimension" d that shows the relative overlay of holograms into sections. Each numbered section (1, 2, 3, . . . ) indicates a spatial location corresponding to its horizontal projection onto the medium 102 where a number of pages are stored as holograms. Along the trailing edge of the pyramid scheme, the sections collectively form a units called books, and these books collectively form units called shelves. For example, in FIG. 1 the shelf that encompasses sections 1–51 has a first book that includes sections 1, 3, 6, 10, 15, and 21 and a second book that includes sections 2, 5, 9, 14, 20, and 27, etc.

As discussed below in greater detail, the numbering of the sections relates to the sequence in which holograms are written to sections. Sections overlap in their spatial projections onto the holographic medium 102 when their corresponding holograms are stored in common locations in the medium 102. For example, point p1 in the medium 102 is included in the spatial projections for sections 1, 3, and 6, and point p2 is included in the spatial projections for sections 2, 5, 9, 10, 15, and 21.

If at most n holograms may overlap at a spatial location, then each section should contain at most n/d holograms where d is the number of overlapping sections in the stacking dimension as shown in FIG. 1. That is, a stack of n/d holograms are effectively written to the same fully overlapping location (i.e., a section's horizontal projection). The sizing of the parameters n and d can be made according to the details of the operating conditions so that most or all of the dynamic range of the holographic medium 102 is used. For example, the multiplexing density n should be bounded according to the dynamic range of the holographic medium 102. Then if a specified multiplexing method has an addressing density of at least n/d within each section, a stacking dimension d can be used. In this way the present invention enables effective use of the capacity for storage according to the limits of the holographic medium 102 and not according to the limits of the multiplexing method.

The dynamic range of a holographic medium is conventionally characterized by a dimensionless parameter known as the M# ("M number") [1;2]. The M# depends on the properties of the holographic materials, and nominal values are in the range 0.01–10. Similarly the already-used dynamic range can be characterized by the parameter M#[buildup] ("M number buildup"), and the available dynamic range M#[available] ("M number available") is then:

$$M\#[available]=M\#-M\#[buildup]. \quad (1)$$

An upper bound $n_{max}$ for the useable multiplexing density n can be set by the M# and a prescribed diffraction efficiency η according to the formula [1, p. 24]:

$$n_{max} = \frac{M\#}{\sqrt{\eta}}. \quad (2)$$

For example, M#=10 and η=0.00025 gives $n_{max}$~632 so that one can set n=600. Then a prescribed multiplexing method, which may be determined by available hardware, can be used to determine the addressing capability within each section (i.e., n/d).

For example, U.S. patent application "Process for Holographic Multiplexing" (with inventors W. Wilson, M. Ayres, C. Shuman, and K. Curtis, filed Jul. 22, 2002), which is incorporated herein by reference, discloses a multiplexing method involving a spherical reference beam that is shifted to record multiple holograms in combination with physically shifting the holographic medium relative to the reference beam and the data beam. Then each shift of the holographic medium results in writing to another section in FIG. 1, and the reference beam is shifted to effect multiplexing within each section. Nominal values for the sizing parameters are multiplexing density n=600 and stacking density d=6 so that n/d=100 holograms are written in each section. Alternatively, if angular multiplexing is used to completely access the dynamic range of the medium with multiplexing density n=600, then d=1 and n/d=600 holograms are written in each section. Alternatively, if shift multiplexing is used to completely access the dynamic range of the medium with multiplexing density n=600, then d=600 and n/d=1 hologram is written in each section.

The numbering of the sections in FIG. 1 represents the order in which they are written with data, from section 1 to section 51. The strategy shown is to always write a section in the highest position available that conforms to the exposure schedule. This always uses up the most heavily exposed media first. The strategy forms a 'pyramid' with a steep leading edge and a more gradual trailing edge. The steep leading edge (e.g., along sections 1, 3, 6, 10, 15, and 21, the first book) represents a small loss of addressing capability where portions of the holographic medium to the left of section 21 are not written at the density achieved elsewhere in the medium since there are fewer overlapping sections. (This loss of addressing may however be reclaimed if the spatial dimension is circular (e.g., a "circular shelf") so that these locations to the left of section 21 are eventually written to a higher level of exposure.)

According to the sequence shown in FIG. 1, each section is written to a spatial component that has previously been uniformly exposed, thereby avoiding the disadvantages of writing to non-uniformly exposed media as discussed above. That is, writing in two sections with adjacent spatial projections provides a substantially uniform exposure level for a sequentially subsequent section with a spatial projection that overlaps the two sections. This sequentially subsequent section will have a substantially uniform exposure level from previous writing operations so long as the available dynamic range (M#[available]) is uniform to within some tolerance (e.g., 10%) across its spatial projection in the medium. However, as discussed below, it is generally preferable to maintain uniform exposure levels by maintaining uniform exposure times to within some equivalent tolerance.

Furthermore, the sequence shown in FIG. 1 may be designed to exhaust (or nearly exhaust) the dynamic range (M#) of the underlying holographic medium with limited delays between the first and last writing operations to a spatial location in the medium. This avoids latency problems in some operational settings where the medium may not respond acceptably to writing operations after a substantial latency period between writing operations.

For some formulations of the holographic medium, partial exposure may lead to chemical changes wherein the sensitized photochemicals slowly and spontaneously react even in the absence of light, causing their concentration to decay slowly over a period of hours, days, or months. The present invention minimizes the problems caused by this latency effect by sequencing the writing operations to avoid delays when writing holograms to the holographic medium. Additionally other approaches to latency problems may be included in specific embodiments in accordance with the present invention. First, temporal thresholds (e.g., a latency period) may be used to quantify when a lapse in writing to a location in the medium results in "staleness" so that some portion of the dynamic range has been lost. These thresholds (e.g., hours, days or months) would depend on specific material properties of the medium. Secondly, after some latency period, the available dynamic range can be re-calibrated, possibly from latency models associated with the medium or from direct measurements of the available dynamic range as described below. Thirdly, after some latency period, subsequent writing can begin at a fresh location. This latter option (most conservative) is discussed in greater detail below.

The present invention enables dynamic exposure scheduling to maintain uniform exposure of the holographic medium up to the limits of the dynamic range (M#). As discussed below in further detail, the available dynamic range (M#[available]) can be estimated from the diffraction efficiency of a measured hologram. Then uniform exposure of the medium can be maintained by monitoring a clock that measures exposure times at different locations since, in general, exposure times can be calibrated to determine their effect on the available dynamic range (M#[available]). In this way, uniform exposure to within some tolerance can be maintained when sequentially writing holograms to sections as shown in FIG. 1. For example, nominal requirements may include uniform exposure times across the medium to within 10%. Similarly a clock may be used to monitor latency problems by monitoring the temporal gaps between writing to locations in the medium.

Figure 2:
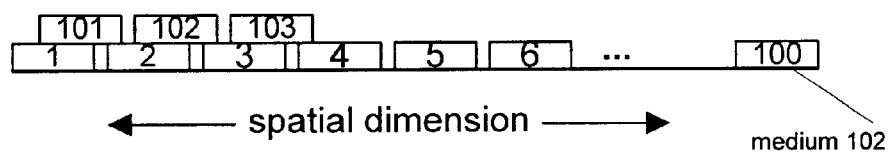
FIG. 2 shows a conventional method of writing holograms.

The present invention advantageously enables use of the dynamic range of the holographic medium as compared with conventional approaches that exploit only a limited portion of the dynamic range of the medium, permit non-uniform exposure of the medium, and ignore latency issues. For example, FIG. 2 shows a conventional approach to hologram writing where the writing proceeds linearly in the lateral spatial dimension from section 1 to section 100 (at the terminus) and then ends or else proceeds with overlapping sections beginning with section 101.

With reference to FIG. 1, a book (e.g., sections 1, 3, 6, 10, 15, 21) is called an "open book" if writing has commenced in some section but addressing capability is available for additional writing. When this addressing capability is exhausted (or otherwise no longer available) the book is called a "closed book." As illustrated by the embodiment shown in FIG. 1, the present invention minimizes the effects of latency by limiting the number of partially written books to d, a stacking dimension that can be designed to exploit the addressing capability of the medium. For example in FIG. 1 where d=6, after sections 1–20 have been written there are six open books. After section 21 has been written, there are five open books since the first book, which includes sections 1, 3, 6, 10, 15, and 21, is now a closed book. Thus, the stacking dimension d provides a bound on the number of currently open books corresponding to partially written portions of the medium. By contrast, in FIG. 2 the equivalent number of open books (i.e., partially written portions of the medium) is bounded only by the partition that is being written.

The gap in FIG. 1 represents the boundary between shelves. The sections marked with 'X's (i.e., X1, X2, X3) form a 'bookend' that cannot contain user data because they are not recorded over uniformly exposed media. However, these bookend sections must be physically exposed in order to correctly schedule the overlying sections. That is, section X1 is exposed after section 45 and before section 46, section X2 is exposed after section 48 and before section 49, and section X3 is exposed after section 50 and before section 51. Then in FIG. 1 the boundary includes sections corresponding to a first book, where sections 34 and 41 are written with data and sections X1, X2, and X3 are exposed without writing data, and a second book where only section 40 is written with data. In general, the capacity penalty for a shelf boundary is two books minus three sections if strict exposure uniformity is to be maintained.

As discussed above, writing must begin at a fresh location when a new writing session is started in some operational settings. This leads to a loss of writing capability known as an under-run penalty. In a worst case, new data is unavailable and writing is stopped after writing the lowest section of a new book (e.g., section 22). When writing resumes, the next available location becomes section 28. The entire inverted pyramid (i.e., sections 23–27, 29–33, 36–39, 43–45, 47–48, and 50) above section 22 is wasted. In general, the number of wasted sections in this scenario is (d(d+1)/2−1), where d, the stacking dimension, is the number of sections per book. In another case, when writing is stopped after writing the highest section of a book (e.g., section 27) the remaining sections of the inverted pyramid (i.e., sections 29–33, 36–39, 43–45, 47–48, and 50) above section 22 are wasted. In general, the number of wasted sections in this scenario is (d(d−1)/2). Thus, the number of wasted sections when writing is restarted in a previously unwritten portion of the medium can be bounded between (d(d−1)/2) and (d(d+1)/2−1), where d is the stacking dimension. Because of this, it is often desirable to use multiplexing schemes with a small stacking dimension d (e.g., d=1). However, as discussed above, the choice of a multiplexing scheme typically includes other issues (e.g., available hardware).

In order to avoid the under-run penalty and also to generally enhance data integrity, exposure levels of the medium may be dynamically monitored. For example, whenever the first page in a book location (e.g., Section 1 in FIG. 1) is written in the current session, a read-after-write operation is performed. From this read-after-write operation, the data can be verified, and additionally the diffraction efficiency and available dynamic range (M#[available]) for the location can be estimated as discussed below. A table of M#[available] values can be maintained for all locations in the trailing edge of the current pyramid (i.e., "open books"). These remaining M#[available] values then can be used for dynamic exposure scheduling.

Additional variations in the approach outlined above may be employed. For example, if the location of the first page in a book location was written in a previous session, the exposure may be made more conservatively or interactively. In general, dynamic exposure scheduling will result in sparsely populated books. This process can be managed at the logical level as illustrated by example below.

The exposure level (M#[buildup]) of a holographic storage medium can be measured in principle by recording and then reading back a single hologram so that the available dynamic range (M#[available]) can be estimated from Eq. 1. This measurement process is based on the relationship between dynamic range and diffraction efficiency. The already-used dynamic range (M#[buildup]) is related to hologram diffraction efficiency by:

$$M \#[\text{buildup}] = \sum_{i=i}^{M} \eta_i^{1/2}, \tag{3}$$

where M is the number of holograms and $\eta_i$ are the diffraction efficiencies of the holograms. ([1], p. 104) The diffraction efficiency ([1], p. 24) is generally defined by a measure of the amount of power that is effectively diffracted:

$$\eta = \frac{\text{Diffracted Power}}{\text{Incident Power}}. \tag{4}$$

Figure 3:
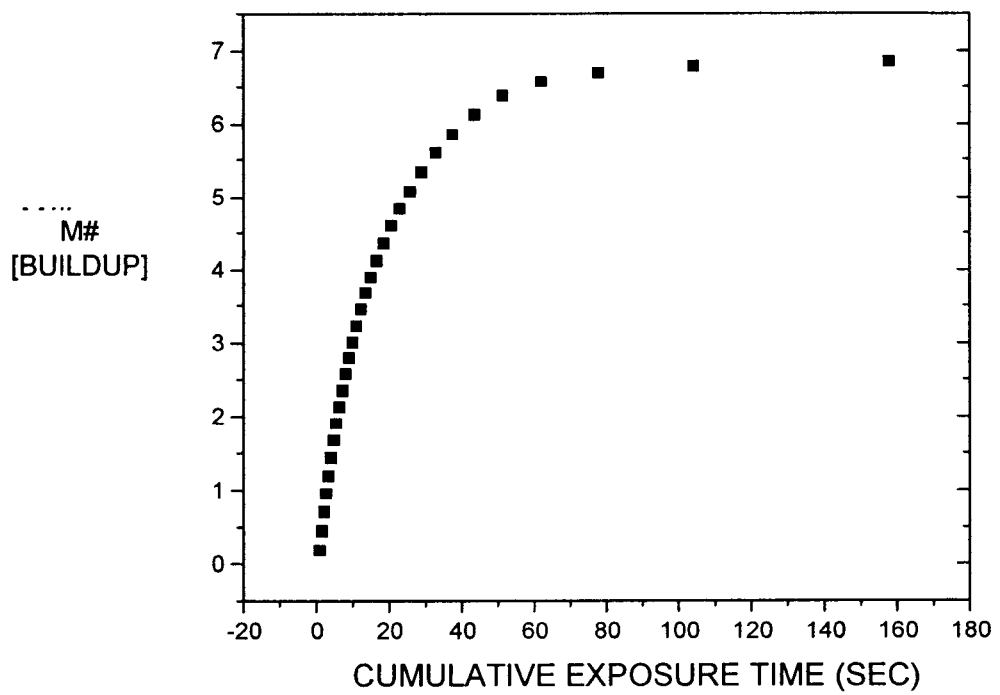
FIG. 3 shows a curve of dynamic range buildup as a function of exposure time.

For a given operational setting a media exposure curve can be used to show the relationship of the available dynamic range to exposure time. For example, FIG. 3 shows a plot of experimental data demonstrating how M#[buildup] asymptotically approaches a maximum value over time. For a given set of experimental data, a parametric characterization of M#[buildup] as a function of cumulative exposure time x may be obtained as for example, $$M \#[\text{buildup}](x) = \frac{A_1}{1 + \left(\frac{x}{x_0}\right)^\rho}, \tag{5}$$

where $A_1$ is the dynamic range (M#), which is generally known as a property of the material, and $x_0$ and $\rho$ are regression variables ($\rho$ is a negative number).

Differentiating with respect to x yields $$\frac{d}{dx} M \text{ \#[buildup]}(x) = \frac{-A_1 \rho x^{\rho-1}}{x_0^\rho \left(1 + \left(\frac{x}{x_0}\right)^\rho\right)^2} \approx \frac{\eta_i^{1/2}}{\Delta x}, \quad (6)$$

where $\eta_t^{1/2}$ is square root of the measured diffraction efficiency of a test hologram ($\Delta M\#$), and $\Delta x$ is the known exposure duration. Thus, knowledge of the ratio of root diffraction efficiency to exposure time allows one to solve Eq. 6 for x, the cumulative exposure time. The already-used dynamic range M#[buildup] is then determined as a direct function of x as shown in FIG. 3, and hence M#[available] is likewise determined from Eq. 1. In practice, it will probably be most convenient to solve Eq. 6 numerically rather than analytically (e.g., from a look-up table).

The diffraction efficiency can be measured by conventional devices according to Eq. 4. Typically, the incident power can be read directly from the laser device that generates the probe beam (or reference beam) to read the hologram (e.g., from the input power to the laser or from an internal sensor within the laser). And typically the reconstructed signal beam is read at a CCD (charge-coupled-device) camera, where the pixel values can be summed to estimate the diffracted power.

The curve in FIG. 3 has a monotonically decreasing derivative so that an estimate of the local derivative of the curve can establish M#[buildup] unambiguously. However exposure curves may in general exhibit distinct points where the derivative is nearly the same (e.g., a flat "pre-sensitization" tail at the leading edge of the curve will look just like the trailing asymptote). In such a case, other means must be used to choose between the ambiguous points. This may include, for example, foreknowledge of the number of holograms written, and/or adhering to a practice of pre-sensitizing any region of the medium completely upon the first write operation (which is probably necessary in most operational settings).

Also, in practice the estimate of the M#[buildup] may be very noisy since the derivative of the exposure curve in FIG. 3 changes rather slowly through the useful region. However, since the derivative changes more quickly when the dynamic range is "almost used up", this method may desirably provide an imminent warning to stop writing. Additionally, this method may desirably identify media defects that can be similarly detected.

As an example of dynamic exposure scheduling using measurements to estimate the available dynamic range (M#[available]), assume that the holographic medium 102 in FIG. 1 is initially blank. Assume that the medium 102 has a dynamic range M#=10 and the desired diffraction efficiency is η=0.00025. Then in accordance with the bound given in Eq. 2 one can set then multiplexing density as n=600. In FIG. 1, the stacking density is d=6, and so n/d=100 holograms can be recorded in each section.

As a first step in the operation, the device controller locates the medium to the position for recording section 1. The controller then writes a single hologram by exposing the medium for the duration appropriate for writing unexposed media. The controller then reconfigures the device and reads the hologram back. Based on the measured intensity of the read image, the device applies Eq. 6 as described above and confirms that the media underlying section 1 indeed had the full expected dynamic range M#[available]=M#=10 at the start of the write operation. The controller then proceeds to write the remaining 99 holograms in section 1 without reading them. The exposure time for each hologram is adjusted to result in a diffraction efficiency of η=0.00025. In accordance with Eq. 3 the final estimate of M#[available] in section 1 becomes 10−100*sqrt(0.00025)=8.42.

Next, the controller moves the medium for recording in section 2, and repeats the process. A first hologram is written and read back, but in this case the estimate for M#[available] turns out to be 10.1 rather than 10.0. Then 99 more holograms are written to fill out section 2, and the estimate of M#[available] there is updated to 10.1−100*sqrt(0.00025)= 8.52.

Then the controller moves to section 3 and determines that section 3 is recorded in media where M#[available] is already known. Five-sixths of section 3 overlaps section 1, so M#[available] for that volume of media is 8.42. Similarly, the one-sixth of section 3 that overlaps section 2 has M#[available]=8.52. The controller calculates the required write exposure time for M#[available]=8.42 and for M#[available]=8.52 and establishes that they are within 10% of each other. Based on this, the controller determines that it is safe to treat section 3 as a uniformly pre-exposed volume of media, and calculates a combined estimate of its M#[available] as (⅚)*8.42+(⅙)*8.52=8.44. The controller then uses this figure to calculate the exposure times, and writes the 100 holograms, filling up section 3. The estimate of M#[available] is updated to 8.44−100*sqrt(0.00025)= 6.86.

This process continues as the controller writes sections 4 through 22. For each of the sections where the controller does not have a measured estimate of M#[available] (i.e., sections 4, 7, 11, 16, and 22), the first hologram written is read back and the estimate is calculated. For all other sections, the estimate of M#[available] is derived from the two underlying sections as described above. For this hypothetical case, suppose that all estimates of M#[available]in virgin media were near the fill nominal value of 10, and that all overlying sections meet the requirement for uniform pre-exposure.

Next, the controller is given a command to eject the medium. Before ejecting, the controller locates to a special directory area on the medium and writes a directory record telling which sections have been written. The medium is carried to another device and 500 read operations are performed on records in sections 12 and 19, thereby diminishing the local M#[available]. Then, the medium is ejected and carelessly placed on a radiator. It is left there for a month, and the heat diminishes the M#[available] of the whole medium by 1.5.

At a later time, the medium is inserted into another device for writing. The controller in that device reads the directory and establishes that the next write location is section 23. It makes a preliminary estimate that the M#[available] in section 23 should be about 10−100*sqrt(0.00025)=8.42. The controller calculates a write exposure time based on this estimate, and then doubles it to account for the fact that no measurements have yet been taken to estimate M#[available]. A hologram is written and then read back. From the write exposure duration and the measured read diffraction strength, the controller learns that the initial estimate for M#[available] was in fact 6.92, rather than 8.42 as expected. However, since the hologram was deliberately overexposed, suppose it turns out that the data is recoverable, and has sufficient diffraction efficiency for reliable reading. (In general if the test hologram is insufficiently strong, any data in it can be relocated to another address, or alternatively further exposure in the same location may be attempted.)

The controller then writes the remaining 99 holograms in section 23 and updates its estimated M#[available] for the section to 5.33. Section 24 is written in an analogous manner; its initial M#[available] is also about 1.5 lower than expected, and its final M#[available] comes in at 3.75.

Next comes section 25, which shares ⅔ of its volume with the heavily read section 12. However, the controller has no way of knowing this. The controller makes the usual, conservative double-length exposure when writing the first hologram in section 25, and then reads the hologram back to measure its diffraction efficiency and verify its data. Because section 25 has been somewhat non-uniformly exposed, it may or may not record reliably. In any case, the litmus test for successful recording is the actual bit error rate of the test data page. (Non-uniformly exposed media may support sufficient diffraction efficiency but still cause data errors due to distortion over the hologram.) Suppose for the sake of this example that the error rate in the test page of section 25 is sufficiently low, and that the section is subsequently recorded with a final M#[available]=1.5.

Similarly, section 26 shares media with both heavily read sections 12 and 19. The controller writes the first hologram conservatively according to the strategy outlined above, and reads it back. In this case, suppose that the underlying non-uniformity is too high, and the read data contains excessive bit errors. The controller then evokes an exception-handling strategy; for example, section 26 and all those above it (27 and 33) are removed from the recording sequence.

In this case, section 28 is next to be recorded. The test hologram is written and read, and the rest of the section is written leaving an estimate of M#[available]=8.45.

Sections 29, 30, and 31 follow. These sections are written in previously measured media, so test holograms are not read. Instead, estimates for their M#[available] are derived from the two underlying sections as described above. Suppose the estimated remaining M#[available] after writing section 31 turns out to be 2.18.

Section 32, next written, overlays section 25 (with M#[available] 1.5) and section 31 (M#[available]=2.18). Based on these disparate values, the controller determines that the required exposure times for the two parts of section 32 are not within 10% of each other, so that section 32 is non-uniformly exposed. There are several possibilities for handling this exception. In one embodiment, the controller will resort to writing and then reading one or more test holograms and checking their bit error rate to determine whether the section should be used. In another embodiment, the section will simply be discarded. Assume for the sake of this example that section 32 is discarded, and thus so is section 39 which substantially overlays it (as does section 33, but it was already discarded).

The controller continues writing in an analogous manner. When it comes to blocks 45, 48, 50, and 51, it will find that the estimated M#[available] is too low to write the full 100 holograms (due to the global loss of 1.5 by heat). In these cases, alternative embodiments may have the controller write fewer than 100 holograms, or skip the sections altogether.

As illustrated by the above example, the present invention enables combined exposure scheduling of the sections of the medium so that adjacent sections are exposed to provide a substantially uniform exposure level for a subsequently-written overlapping section. In this way, the dynamic range of the medium can be more fully exploited for storing holograms. This example is meant to be illustrative only. In other embodiments, the controller may read back test holograms more frequently than once per book (e.g., once per section), or the controller may increase the frequency of read back operations as the estimated M#[available] grows low so as to improve confidence that holograms are being written correctly. Other policy decisions such as when and how much to conservatively overexpose, whether to write partial sections, and how to handle exceptions may vary in other embodiments. The present invention may be applied to a variety of operational settings beyond the specific examples presented above. For example, although FIG. 1 shows the method applied to a multiplexing method with overlapping sections in one spatial dimension, alternative multiplexing methods may be employed with overlapping sections in multiple spatial dimensions.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method of writing holograms, comprising:
writing at least one hologram in a first section of a holographic medium having a spatial dimension;
writing at least one hologram in a second section of the holographic medium, the second section being spatially adjacent to the first section; and
writing at least one hologram in a third section of the holographic medium after writing in the first section and writing in the second section, the third section being included in a spatial overlap of the first section and the second section, wherein
writing in the first section and writing in the second section provide a substantially uniform exposure level for writing in the third section.

2. A method according to claim 1, further comprising:
writing at least one hologram in a fourth section of the holographic medium, the fourth section being spatially adjacent to the second section; and
writing at least one hologram in a fifth section of the holographic medium, the fifth section being spatially adjacent to the third section, and the fifth section being included in a spatial overlap of the second section and the fourth section, wherein
writing in the second section and writing in the fourth section provide a substantially uniform exposure level for writing in the fifth section.

3. A method according to claim 2, further comprising:
writing at least one hologram in a sixth section of the holographic medium, after writing in the third section and writing in the fifth section, the sixth section being included in a spatial overlap of the third section and the fifth section, wherein
writing in the third section and writing in the fifth section provide a substantially uniform exposure level for writing in the sixth section.

4. A method according to claim 3, further comprising:
writing at least one hologram in a seventh section of the holographic medium, the seventh section being spatially adjacent to the fourth section; and
writing at least one hologram in an eighth section of the holographic medium, the eighth section being spatially adjacent to the fifth section, and the eighth section being included in a spatial overlap of the fourth section and the seventh section, wherein
writing in the fourth section and writing in the seventh section provide a substantially uniform exposure level for writing in the eighth section.

5. A method according to claim 4, further comprising:
writing at least one hologram in a ninth section of the holographic medium, after writing in the fifth section and writing in the eighth section, the ninth section being spatially adjacent to the sixth section, and the ninth section being included in a spatial overlap of the fifth section and the eighth section, wherein
writing in the fifth section and writing in the eighth section provide a substantially uniform exposure level for writing in the ninth section.

6. A method according to claim 5, further comprising:
writing at least one hologram in a tenth section of the holographic medium, after writing in the sixth section and writing in the ninth section, the tenth being included in a spatial overlap of the sixth section and the ninth section, wherein
writing in the sixth section and writing in the ninth section provide a substantially uniform exposure level for writing in the tenth section.

7. A method according to claim 1, wherein writing at least one hologram in the first section includes writing a test hologram in the first section, and the method further comprises:
measuring an efficiency of the test hologram in the first section; and
estimating an available dynamic range at a location of the first section in the holographic medium from the efficiency of the test hologram in the first section.

8. A method according to claim 7, further comprising:
adjusting an exposure schedule for the location of the first section based on an estimate for the available dynamic range at the location of the first section.

9. A method according to claim 7, wherein writing at least one hologram in the second section includes writing a test hologram in the second section, and the method further comprises:
measuring an efficiency of the test hologram in the second section; and
estimating an available dynamic range at a location of the second section in the holographic medium from the efficiency of the test hologram in the second section.

10. A method according to claim 9, further comprising:
adjusting a combined exposure schedule for the locations of the first section and the second section based on estimates for the available dynamic ranges at the locations of the first section and the second section.

11. A method of writing holograms, comprising:
numbering a plurality of sections in sequence, each section having a spatial projection onto a holographic medium; and
writing at least one hologram in each of the sections in sequence, wherein
writing in two sections with adjacent spatial projections provides a substantially uniform exposure level for a sequentially subsequent section with a spatial projection that overlaps the two sections.

12. A method according to claim 11, wherein, after writing at least one hologram in each of the sections in sequence, a given section includes a test hologram, and the method further comprises:
measuring an efficiency of the test hologram; and
estimating an available dynamic range at a location of the given section in the holographic medium from the efficiency of the test hologram.

13. A method according to claim 12, further comprising:
adjusting an exposure schedule for the location of the given section based on an estimate for the available dynamic range at the location of the given section.

14. A method according to claim 11, wherein, after writing at least one hologram in each of the sections in sequence, a plurality of given sections includes a plurality of test holograms, and the method further comprises:
measuring efficiencies of the test holograms; and
estimating available dynamic ranges at locations of the given sections in the holographic medium from the efficiencies of the test holograms.

15. A method according to claim 14, further comprising:
adjusting a combined exposure schedule for the locations of the given sections based on estimates for the available dynamic ranges at the locations of the given sections.

16. A method according to claim 11, further comprising:
exposing a bookend of additional sections at a boundary of a shelf of the sections to provide a substantially uniform exposure level when writing holograms in the shelf in sequence near the boundary, each additional section having a spatial projection onto the holographic medium and overlapping with at least one section of the shelf.

17. A holographic medium tangibly embodying holograms in a sectional format, the format comprising:
a plurality of sections, each section having a spatial projection onto the holographic medium, and each section having a sequence number for storing holograms in sections; and
at least one hologram in at least one section, wherein
each section has an exposure level corresponding to holograms therein, and
two sections with adjacent spatial projections provide a substantially uniform exposure level for a sequentially subsequent section with a spatial projection that overlaps the two sections.

18. A holographic medium according to claim 17, wherein
the at least one hologram includes a test hologram in a given section, and
an efficiency of the test hologram provides an estimate for an available dynamic range at a location of the given section in the holographic medium.

19. A holographic medium according to claim 17, wherein
the at least one hologram includes a plurality of test holograms in a plurality of given sections, and
efficiencies of the test holograms provide estimates for available dynamic ranges at a locations of the given sections in the holographic medium.

20. A holographic medium according to claim 17, wherein the format further comprises:
a bookend of exposed additional sections at a boundary of a shelf of the sections, each additional section having a spatial projection onto the holographic medium and overlapping with at least one section of the shelf and the bookend providing a substantially uniform exposure level for holograms in the shelf near the boundary.

* * * * *